Patented Oct. 29, 1940

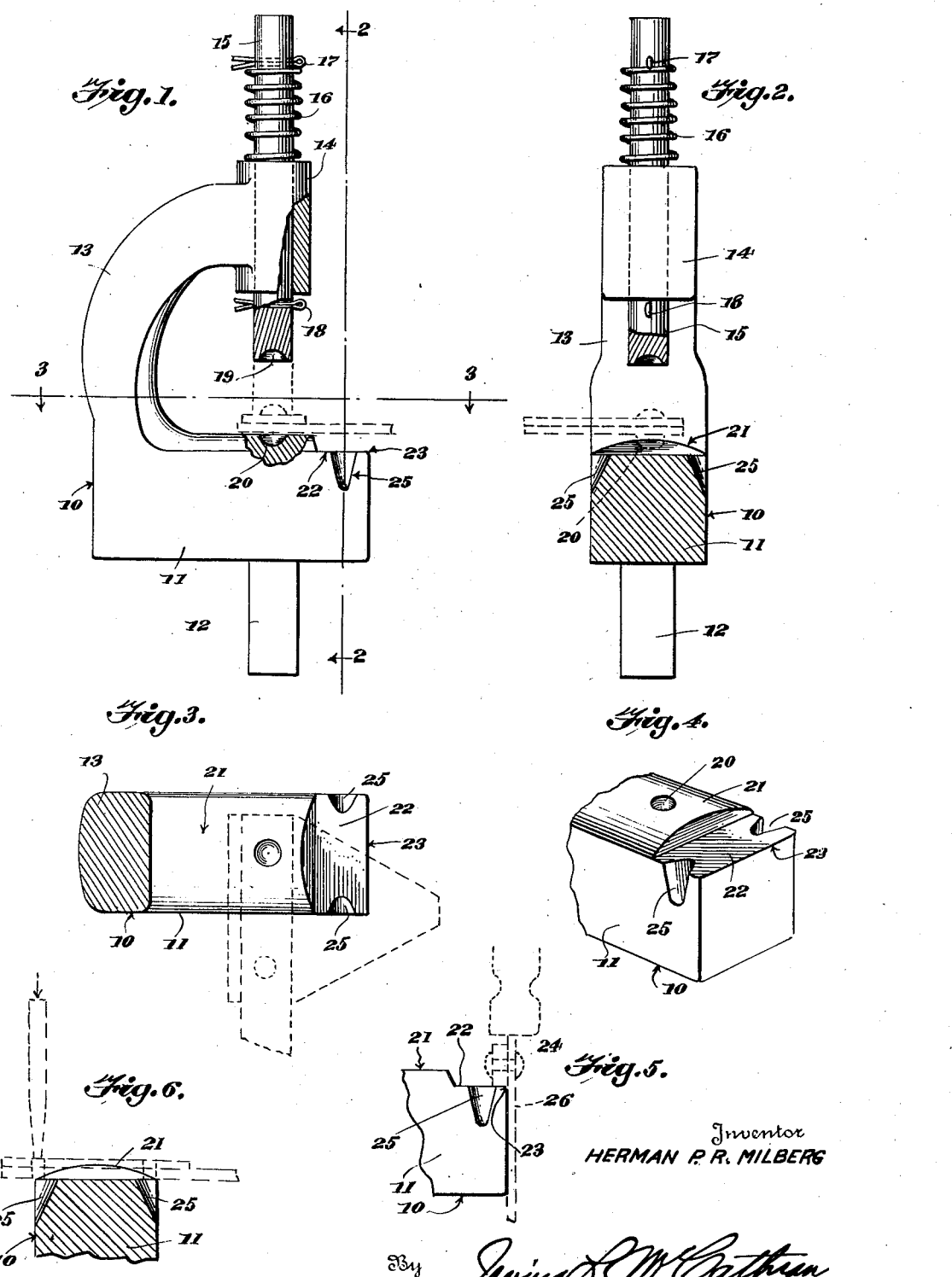

2,219,631

UNITED STATES PATENT OFFICE 2,219,631

RIVET SETTING AND REMOVING TOOL

Herman P. R. Milberg, Carver, Minn.

Application June 23, 1938, Serial No. 215,457

1 Claim. (Cl. 78—46)

This invention relates to a rivet-setting and removing tool and has for one of its objects the production of a light, portable and inexpensive tool for setting and removing rivets and particularly the rivets of mower and binder sickle bars.

A further object of this invention is the production of a tool wherein the mower bar and the like may be held in a position upon the anvil in a manner whereby the rivet-head may be easily formed and the weight and force of the head forming blow will be taken up entirely by the rivet and not the sickle, the upper face of the anvil being so formed as to hold the sickle away from the upper face of the anvil.

Another object of this invention is the production of a simple and efficient means for facilitating the shearing off of the heads of rivets and the like, to facilitate the replacement of cutter blades of a mower bar and the like.

Other objects and advantages of the present invention will be obvious throughout the following specification and claim.

In the drawing—

Figure 1 is a side elevational view of the tool, certain parts being shown in vertical section;

Figure 2 is a vertical sectional view taken on line 2—2 of Figure 1;

Figure 3 is a horizontal sectional view taken on line 3—3 of Figure 1;

Figure 4 is a fragmentary perspective view of the forward end of the anvil portion of the tool;

Figure 5 is a fragmentary side elevational view of a portion of the anvil portion of the tool, showing the manner of shearing off the head of a rivet;

Figure 6 is a transverse sectional view of the anvil portion of the tool and illustrating the manner of punching out a rivet from a mower bar and the like.

By referring to the drawing, it will be seen that 10 designates the body of the tool which comprises an anvil portion, or base 11, having a rectangular depending anchoring pin 12 which is adapted to fit into a support such as a vise or other suitable means. The anvil portion or base 11 is provided with an upwardly extending and forwardly curved neck 13 which carries a vertically extending sleeve 14.

A plunger 15 is slidably mounted in the sleeve 14 and extends vertically and above the sleeve 14. A coil spring 16 is carried by the plunger 15 and engages the top of the sleeve 14 at its lower end and the upper end of the spring 16 engages a cotter pin 17 to normally urge the plunger 15 upwardly. A cotter pin 18 is carried near the lower end of the plunger 15 to limit the upward movement of the plunger 15. The lower extremity of the plunger 15 is provided with a rivet head forming socket 19, as shown in Figures 1 and 2.

The anvil portion or base 11 is provided with a rivet receiving socket 20 formed in its upper face just below the socket 19 of the plunger 15 and the upper face 21 of the anvil portion 11 is rounded upwardly and transversely, as shown in Figure 2, thereby producing a convex or oval upper face 21 which recedes away from the socket 20 upon either side of the socket 20. Because of this structure, a sickle bar and the like may be placed transversely of the face 21, allowing the rivet to fit within the socket 20, as shown in Figures 1 and 2, and hold the bar 22 shown in dotted lines out of contact with the upper face of the anvil portion 11. All parts of the sickle bar will be held out of contact with the anvil except the rivet which is being set and the rivet will be set straight, even though the sickle might not be held exactly level.

The forward end of the anvil portion is provided with a cut-out flattened shelf portion 22, and an abrupt corner 23 upon which the head of a rivet may be placed, as shown in Figure 5, and by striking the upper edge of the blade 26 which extends above the bar 24 with a hammer, the rivet may be sheared off at its junction with the bar 24 and blade 26. The opposite side upper corner edges of the shelf portion 22 are provided with vertical sockets or notches 25 to facilitate the removal of rivets, as shown in Figure 6, after the heads have been sheared off.

By means of the present device, an operator may hold a mower sickle or bar in one hand upon the anvil portion of the tool, and this will leave the other hand free to set the rivet and to actuate the plunger. The device may be fastened in a vise block of wood or to a blacksmith's anvil, in the conventional manner, or may be supported in any suitable or desired manner, without departing from the spirit of the invention. Through the medium of the present device, an inexperienced workman is enabled to perform a factory job of riveting both quickly and easily, and without the necessity of employing complicated and expensive machinery. Sickle blades may be easily removed by shearing off the rivet heads and punching out the old rivets in the manner shown in Figures 5 and 6, in this way facilitating the repair or replacement of the worn out parts. The neck portion 13 of the tool is so constructed as to allow sufficient space for an operator to handle the work upon the anvil portion 11 of the tool.

Having described the invention, what I claim is:

As an article of manufacture, a tool specially designed for rivet setting on mower and binder sickle bars comprising a base portion, a rivet-forming plunger supported on the base portion, the rivet-forming plunger having a shallow socket formed in the lower end thereof, the lower extremity adjacent the socket thereof extending in a horizontal plane and being adapted to remain out of contact with the sickle bar while a rivet is being set therein, the base portion having a shallow rivet-receiving socket in alignment with the plunger socket, the socket in the base portion being of a depth to support a rivet-carrying sickle bar above the base portion, and the upper face of the base portion being convex in contour and sloping laterally away from the rivet-receiving socket and extending in a horizontal plane at right angles to the convex contour whereby the entire weight upon the base may be carried by the rivet adapted to be placed within the rivet-receiving socket of the base portion to support a sickle bar away from the base portion and prevent the bending of the sickle bar while blades are being riveted upon the bar and as the bar extends transversely of the convex contour of the base.

HERMAN P. R. MILBERG.